(12) United States Patent
Weindorf et al.

(10) Patent No.: US 6,507,286 B2
(45) Date of Patent: Jan. 14, 2003

(54) LUMINANCE CONTROL OF AUTOMOTIVE DISPLAYS USING AN AMBIENT LIGHT SENSOR

(75) Inventors: Paul F. L. Weindorf, Novi, MI (US); Gregory John Milne, South Lyon, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 78 days.

(21) Appl. No.: 09/751,027

(22) Filed: Dec. 29, 2000

(65) Prior Publication Data

US 2002/0101166 A1 Aug. 1, 2002

(51) Int. Cl.[7] .............................. G08B 1/00; G02F 1/17; G05B 39/00
(52) U.S. Cl. ..................................... 340/815.75; 315/82
(58) Field of Search ................. 340/815.75, 815.45, 340/815.4, 980, 439, 461; 345/77, 207, 7.8; 315/82, 149, 159, 157, 150; 348/227, 229

(56) References Cited

U.S. PATENT DOCUMENTS

| | | | |
|---|---|---|---|
| 4,368,406 A | | 1/1983 | Kruzich et al. |
| 4,665,321 A | * | 5/1987 | Chang et al. ............... 307/10.8 |
| 5,337,073 A | | 8/1994 | Tsunoda et al. |
| 5,614,788 A | * | 3/1997 | Mullins et al. ............. 307/10.8 |
| 5,666,028 A | * | 9/1997 | Bechtel et al. ............. 307/10.8 |
| 5,696,483 A | * | 12/1997 | Khalid et al. ............... 116/28.1 |
| 5,760,760 A | | 6/1998 | Helms |
| 5,786,801 A | | 7/1998 | Ichise |
| 5,796,350 A | * | 8/1998 | Fuse .......................... 340/439 |
| 5,896,010 A | * | 4/1999 | Mikolajczak et al. ....... 307/10.8 |
| 5,910,653 A | | 6/1999 | Campo |
| 6,327,522 B1 | * | 12/2001 | Kojima et al. .............. 348/115 |
| 6,337,675 B1 | * | 1/2002 | Toffolo et al. .............. 345/207 |

* cited by examiner

Primary Examiner—Don Wong
Assistant Examiner—Chuc Tran

(57) ABSTRACT

According to the system and the method of the present invention, a display's visibility is maintained depending on lighting conditions that are sensed by an ambient light sensor (16). Logic (10) is applied to the output of the light sensor (16) and in conjunction with a headlight status indicator (14) to determine whether daytime (D) or nighttime (N) lighting condition exists and to determine a brightness level (18) to be commanded to the display. The logic (10) of the present invention maintains a visible display even in situations where a vehicle's headlights are active during daylight lighting conditions.

21 Claims, 4 Drawing Sheets

| | MANUAL 42 | | | | AUTO 34 36 /20 38 40 | | | | 30 32 | |
|---|---|---|---|---|---|---|---|---|---|---|
| | Night | Night | Day | Day | Night | Night | Day | Day | ALS | ALSTC |
| STEP # | DAC | (Nits) 26 | DAC 24 | (Nits) 28 | DAC | (Nits) | DAC | (Nits) | ADC | Compare |
| -3 | | | | | 7 | 0.5 | 5 | 10 | | |
| -2 | 22 | | | | 7 | 0.5 | 5 | 10 | | |
| -1 | | | | | 7 | 0.5 | 5 | 10 | | |
| 0 | | | | | 7 | 0.5 | 5 | 10 | 0-11 | Night |
| 1 | 7 | 0.5 | 5 | 10 | 7 | 0.5 | 5 | 10 | 12 | Day |
| 2 | 11 | 0.77 | 9 | 16 | 8 | 0.59 | 9 | 15 | 13 | Day |
| 3 | 17 | 1.19 | 14 | 25 | 10 | 0.71 | 13 | 23 | 14 | Day |
| 4 | 25 | 1.83 | 22 | 40 | 12 | 0.84 | 15 | 28 | 15 | Day |
| 5 | 39 | 2.83 | 35 | 63 | 14 | 1 | 19 | 34 | 16 | Day |
| 6 | 61 | 4.36 | 55 | 100 | 17 | 1.19 | 21 | 38 | 17 | Day |
| 7 | 94 | 6.73 | 87 | 159 | 20 | 1.41 | 23 | 41 | 18 | Day |
| 8 | 144 | 10.37 | 136 | 252 | 23 | 1.68 | 25 | 45 | 19 | Day |
| 9 | 223 | 16 | 220 | 400 | 28 | 2 | 27 | 50 | 20 | Day |
| 10 | | | | | 33 | 2.38 | 30 | 55 | 21-22 | Day |
| 11 | | | | | 39 | 2.83 | 33 | 60 | 23-24 | Day |
| 12 | | | | | 47 | 3.36 | 36 | 66 | 25-26 | Day |
| 13 | | | | | 56 | 4 | 40 | 73 | 27-29 | Day |
| 14 | | | | | 65 | 4.76 | 44 | 80 | 30-31 | Day |
| 15 | | | | | 79 | 5.66 | 48 | 88 | 32-35 | Day |
| 16 | | | | | 94 | 6.73 | 53 | 97 | 36-39 | Day |
| 17 | | | | | 111 | 8 | 58 | 105 | 40-43 | Day |
| 18 | | | | | 132 | 9.51 | 64 | 117 | 44-48 | Day |
| 19 | | | | | 157 | 11.31 | 71 | 129 | 49-54 | Day |
| 20 | | | | | 187 | 13.45 | 77 | 141 | 55-61 | Day |
| 21 | | | | | 223 | 16 | 85 | 155 | 62-69 | Day |
| 22 | | | | | 223 | 16 | 94 | 171 | 70-79 | Day |
| 23 | | | | | 223 | 16 | 103 | 188 | 80-89 | Day |
| 24 | | | | | 223 | 16 | 113 | 205 | 90-102 | Day |
| 25 | | | | | 223 | 16 | 125 | 227 | 103-116 | Day |
| 26 | | | | | | | 137 | 249 | 117-133 | Day |
| 27 | | | | | | | 150 | 274 | 134-152 | Day |
| 28 | | | | | | | 165 | 301 | 153-174 | Day |
| 29 | | | | | | | 182 | 331 | 175-200 | Day |
| 30 | | | | | | | 200 | 364 | 201-230 | Day |
| 31 | | | | | | | 220 | 400 | 231-255 | Day |
| 32 | | | | | | | 220 | 400 | | |
| 33 | | | | | | | 220 | 400 | | |
| 34 | | | | | | | 220 | 400 | | |
| 35 | | | | | | | 220 | 400 | | |

FIG.2

| STEP # | ALS ADC | ALSTC Compare |
|---|---|---|
| -3 | | |
| -2 | | |
| -1 | | |
| 0 | 0-25 | Night |
| 1 | 26 | Night |
| 2 | 30 | Night |
| 3 | 34 | Night |
| 4 | 38 | Night |
| 5 | 42 | Night |
| 6 | 46 | Night |
| 7 | 50 | Night |
| 8 | 54 | Night |
| 9 | 58 | Night |
| 10 | 62 | Night |
| 11 | 66 | Night |
| 12 | 70 | Night |
| 13 | 74 | Night |
| 14 | 78 | Day |
| 15 | 82 | Day |
| 16 | 86 | Day |
| 17 | 90 | Day |
| 18 | 94 | Day |
| 19 | 88 | Day |
| 20 | 102 | Day |
| 21 | 106 | Day |
| 22 | 110 | Day |
| 23 | 114 | Day |
| 24 | 118 | Day |
| 25 | 122 | Day |
| 26 | 126 | Day |
| 27 | 130 | Day |
| 28 | 134 | Day |
| 29 | 138 | Day |
| 30 | 142 | Day |
| 31 | 146 | Day |
| 32 | 150 | Day |
| 33 | 154 | Day |
| 34 | 158 | Day |
| 35 | 162 | Day |
| 36 | 168 | Day |
| 37 | 170 | Day |
| 38 | 174 | Day |
| 39 | 178 | Day |
| 40 | 182 | Day |
| 41 | 186 | Day |
| 42 | 190 | Day |
| 43 | 194 | Day |
| 44 | 198 | Day |

FIG.4

LUMINANCE CONTROL OF AUTOMOTIVE DISPLAYS USING AN AMBIENT LIGHT SENSOR

CROSS REFERENCE OF RELATED APPLICATIONS

This application is cross referenced to related application Ser. No. 09/658,301 entitled Method and Apparatus for Automatically Controlling Brightness Using a Variable Time Constant Filter filed on Sep. 8, 2000, application Ser. No. 09/642,178 entitled Light Sensor System and a Method for Detecting Ambient Light filed on Aug. 18, 2000 and application Ser. No. 09/747,597.

TECHNICAL FIELD

The present invention relates generally to controlling the luminance of automotive displays and more particularly to utilizing an ambient light sensor to logically control the luminance of the displays.

BACKGROUND OF THE INVENTION

Currently, when a vehicle's headlights are activated, the cockpit displays are dimmed to lower brightness levels for improved viewing conditions. However, there are certain situations, i.e. adverse weather conditions, when the headlights may be activated during daylight, automatically dimming the displays to lower brightness thereby making the displays difficult to read.

This problem is especially apparent in high resolution, backlit displays that are used, for example, in navigation systems. Navigation systems typically have a transmissive or transreflective display that is high resolution to display a lot of detailed information. These displays are difficult to read with lower backlight brightness levels during daytime lighting conditions.

There is a need for logically determining the proper brightness level for a display depending on whether there are daytime or nighttime lighting conditions. In order to provide a useable display, it is important to detect daytime lighting conditions and over ride the commanded nighttime brightness levels that are automatically initiated upon activation of a vehicle's headlights.

SUMMARY OF THE INVENTION

It is an object of the present invention to provide a useable display for both daytime and nighttime lighting conditions. It is another object of the present invention to logically determine and apply the correct brightness setting for a display.

It is a further object of the present invention to utilize an ambient light sensor for determining whether daytime or nighttime lighting conditions are present. It is still a further object of the present invention to control the brightness of a display using an ambient light sensor in conjunction with a dimming switch in order to override automatic dimming of display brightness.

In carrying out the above objects and other objects and features of the present invention, a method and system for detecting daytime lighting conditions and overriding a commanded nighttime brightness level for a display is necessary in order to provide a useable display. According to the system of the present invention, an ambient light sensor is used to sense the lighting condition, determine whether daytime or nighttime lighting conditions are present, and logically select the correct lighting condition for the display.

According to the method of the present invention, the display lighting conditions are sensed by an ambient light sensor. Logic is applied to the output of the light sensor to determine whether a daytime or nighttime lighting condition exists. The logic will utilize information such as whether the headlights are "on" or "off" and whether daytime or nighttime lighting conditions exist, in order to adjust the display to the proper luminance level.

Other objects and advantages of the present invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings:

FIG. 2 is a table of values for daytime illumination levels for the light level sensed by the ambient light sensor for manual and automatic modes and their corresponding brightness commands;

FIG. 4 is a table of values for a logarithmic ambient light sensor.

DETAILED DESCRIPTION OF PREFERRED EMBODIMENTS

Figure 1:
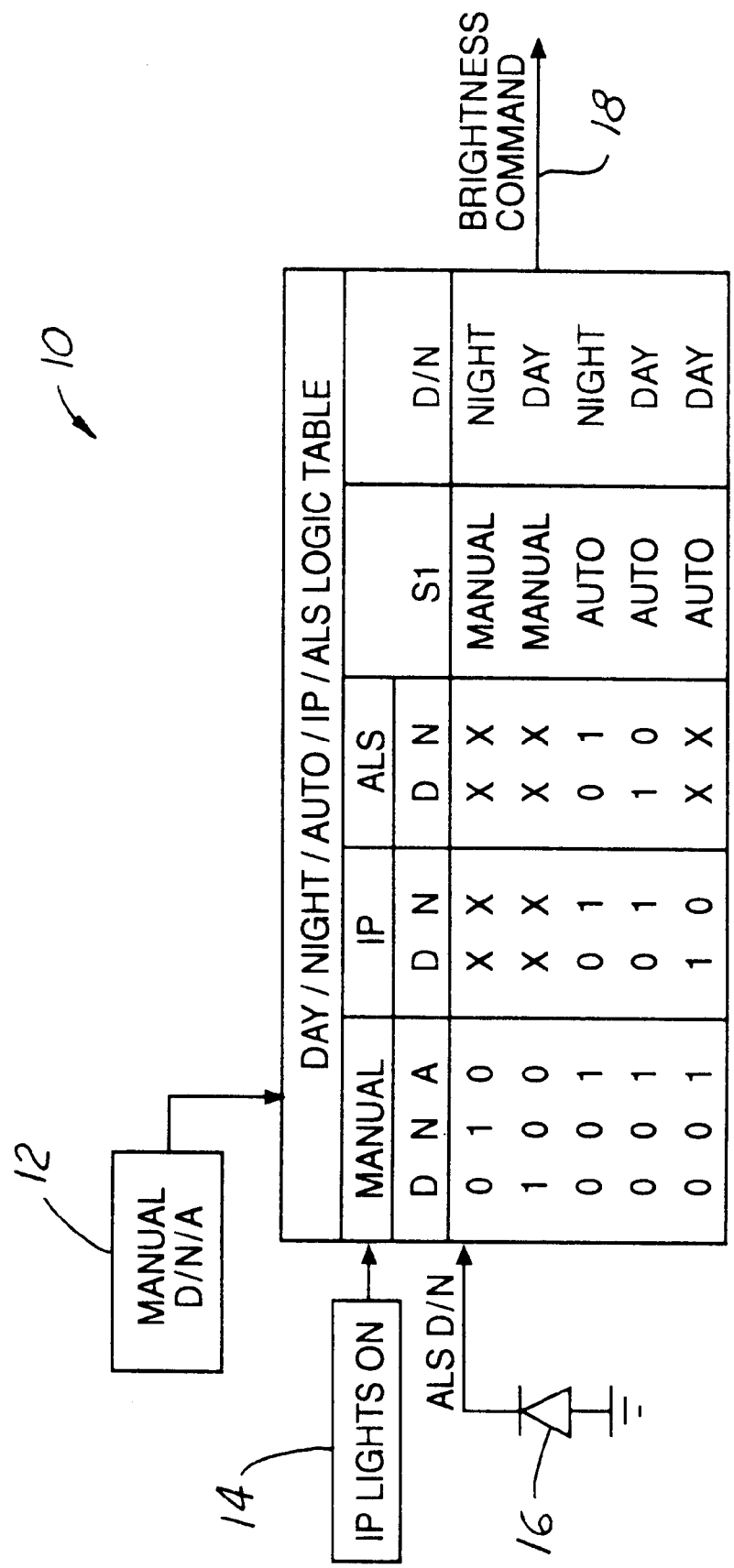
FIG. 1 is a block diagram, including a logic table, of the present invention.

The present invention will be described herein with reference to a large-area, high-resolution backlit display such as an Active Matrix Liquid Crystal Display. It should be noted, however, that the method and system of the present invention may be applied to any display including portable displays in order to extend battery life. According to the system and method of the present invention, the proper daytime or nighttime display brightness levels can be automatically provided for the user. FIG. 1 depicts the logic table 10 of the present invention which includes inputs from; a selector method 12 for switching between manual and automatic modes, a headlight indicator 14 for providing a signal that is representative of whether or not the headlights are activated, and an ambient light sensor 16 for providing a signal indicating a nighttime or daytime ambient lighting condition. An output 18 is provided for setting a desired level of brightness for the display (not shown) that is commanded by the present invention.

In the logic table 10 a "1" indicates that the selection is active, a "0" indicates that the selection is not active, and an "X" indicates that the status of the input does not matter to the logic.

According to the present invention, there are two possible modes, automatic and manual for either daytime or nighttime conditions. In the manual mode, a user selects a desired brightness of the display. Therefore in the manual mode, the output of the ambient light sensor and the output of the headlight indicator do not affect the determination of the brightness setting.

For the manual mode, which is represented by the first two rows of the logic table 10 in FIG. 1, the present invention utilizes predetermined brightness levels that are commanded based on the brightness setting chosen by the user. In one embodiment of the present invention, a look-up table 20, as shown in FIG. 2, stores values for the brightness levels relative to the brightness setting selected by the user. The light level step manually selected by the user is shown in column 42 as steps 1 through 9. The desired brightness command is referenced in the look-up table according to the step setting chosen by the user, and ultimately communicated to the display. For example, columns 22, 24, 26 and 28 contain manual mode information. Columns 22 and 24 contain a step setting value, for night and day lighting conditions respectively, that is sent to a digital to analog converter (DAC). The DAC converts the value into an analog voltage, which in turn controls the display brightness to the Nit level stored in columns 26 and 28 for night and day respectively. It should be noted that the values shown in FIG. 2 are for example purposes only and that one of ordinary skill in the art is capable of adjusting or substituting the values without affecting the outcome of the present invention.

Referring again to FIG. 1 the logic associated with the automatic mode is dependent upon the status of the headlight status 14 input and the ambient light sensor 16 input. However, in one embodiment of the present invention, the output of the ambient light sensor does not affect the determination of daytime or nighttime lighting conditions. This occurs for the instance when the headlights are turned off during automatic mode, as shown in the last row of the logic table 10. In this embodiment of the present invention, the logic automatically applies daytime lighting conditions. This is because it is not advisable, not to mention illegal, to drive without headlights in nighttime lighting conditions. Therefore, when the headlights are not active, it can be assumed that daytime lighting conditions are present.

Typically, in the automatic mode the brightness to be commanded to the display is determined logically based on the ambient light sensor, the headlight status and associated logic. When the headlight status indicates the headlights are active, the ambient light sensor is used to determine if nighttime or daytime lighting conditions are present according to the present invention. This is accomplished by comparing the value of the output of the ambient light sensor to predetermined values that are indicative of nighttime or daytime illumination levels. These levels are shown in FIG. 2, columns 30 and 32. In this regard it is possible to determine whether the ambient light sensor is sensing daytime or nighttime lighting conditions. For example, an ambient light sensor output that is within the range of 0 to 11 of the ambient light sensor analog to digital converter (ALS ADC) would indicate nighttime lighting conditions. An ambient light sensor output that is 12 to 255 ALS ADC would indicate daytime lighting conditions. These predetermined values could be stored in a manner such as a look-up table or the like, where hey can be referenced by the light sensor readings to determine the brightness level that is to be commanded to the display.

When the present invention determines nighttime lighting conditions in the automatic mode (shown in the third row of logic table 10 in FIG. 1), the actual brightness levels that are commanded to the display are provided from a set of predetermined brightness commands that correspond with an instrument lighting control step number (see FIG. 2, column 42, step numbers 1–21). For example, the brightness levels may be stored in a look-up table, such as that shown in FIG. 2, which contains brightness levels that correspond to a luminance control (i.e., instrument lighting control 65 shown in FIG. 3) on the instrument panel of the vehicle. An example of the values for auto-mode nighttime lighting conditions is provided in FIG. 2 at columns 34 and 36. In one embodiment, the instrument lighting control commands step numbers 1 through 21 (column 42, FIG. 2). The corresponding value sent to the brightness control DAC is shown in column 34 of FIG. 2, which results in a corresponding display brightness as indicated in column 36 of FIG. 2. The instrument lighting control 65 shown in FIG. 3 only is typically a variable dimming control that allows a vehicle operator to dim or brighten the lights on the instrument panel. This feature ensures that, in the nighttime automatic mode, the present invention sends a brightness level to the display so that when the operator dims the control panel lighting, the display also dims.

The present invention is especially useful in the automatic mode when the headlights are on during daytime lighting conditions. This combination is indicated in the fourth row of the logic table 20 of FIG. 1. The present invention allows an override of the automatic dimming of the display that usually occurs when headlights are activated and provides a brightness command that maintains a visible display. In the prior art, an interior dimming system is automatically activated when the park lights or headlights are on. For a high-resolution display, such as the backlit liquid crystal display, this is unacceptable in instances when the headlights are turned on during daytime lighting conditions. In this particular event, the display is automatically dimmed to an unusable level. The present invention allows the automatic dimming to be overridden by sensing the daylight lighting condition, even with the headlights active, and logically selecting the correct brightness command for the display from a table of predetermined brightness levels that correspond to the output of the ambient light sensor. An example of a look-up table having brightness levels for automatic daytime lighting conditions is shown in FIG. 2 at columns 38, 40 and 30. In the automatic daytime mode of operation, the value to be sent to the brightness control DAC (column 38) is determined from the ambient light sensor value (column 30) to yield the display brightness as shown in column 40.

The present invention applies a filter to the ambient light sensor output, which filters the ambient light sensor values to smooth the transition between daytime steps. This filter ensures that regardless of whether the lighting conditions are rapidly changing, i.e. fast moving clouds, the modifications to the brightness command are controlled to prevent undesirable changes the brightness level.

It is necessary to avoid undesirable changes in the brightness level of the display in certain situations. In such instances, the output of the ambient light sensor is filtered to eliminate objectionable display variations under rapidly changing lighting conditions. The filter also avoids switching between daytime and nighttime lighting if the ambient lighting is at a predetermined threshold level for determining lighting conditions using a combination of time delay and hysteresis. In instances where changes in the lighting conditions persist, i.e., during a period of travel through a long tunnel, the display brightness is modified slowly at first and then more quickly to the final desired value.

There are several ways the filter can be implemented. For example, the output ambient light sensor can be digitized by an analog to digital converter and then subsequently filtered by a software algorithm. In the preferred embodiment of the present invention, the filter is described in co-pending application Ser. No. 09/658301 Method and Apparatus for Automatically Controlling Brightness Using a Variable Time Constant Filter. The details of this filter will not be described in detail herein, but in summary the filter is a time constant filter that is used to select the proper brightness as a function of a time constant and the separation between the step numbers, shown in column 42 of FIG. 2. The filter uses the separation between the current brightness step and the step indicated by the ALS ADC, column 30. The filter multiplies this separation in step numbers by a time constant to determine how long to wait before transitioning one step towards the step indicated by the ALS ADC column 30. Therefore, if a large ambient brightness change occurs, the algorithm waits longer to change by one step than for a smaller ambient brightness change. In this manner, "picket fence effect" brightness changes are avoided because the filter waits much longer to change the display brightness for large sudden ambient brightness changes than for small changes.

The time delay is used to prevent objectionable switching between daytime and nighttime step levels since the transition between daytime and nighttime brightness levels is sudden. When the step number goes below a nighttime threshold and the headlights are active, the filter will wait for a predetermined period of time, such as ten seconds, before making the transition into a nighttime mode. The step number must remain below the threshold for the entire predetermined time. Should the step number increase above the threshold before the predetermined period of time, the time-out process will re-start.

Hysteresis is applied to the present invention when a transition is made from nighttime to daytime brightness levels. The threshold for a change from night to day is higher than the threshold for a change from day to night. In this regard, the filtered ambient light sensor value must increase a predetermined amount above a nighttime threshold to determine when to switch from a nighttime lighting condition to a daytime lighting condition.

Figure 3:
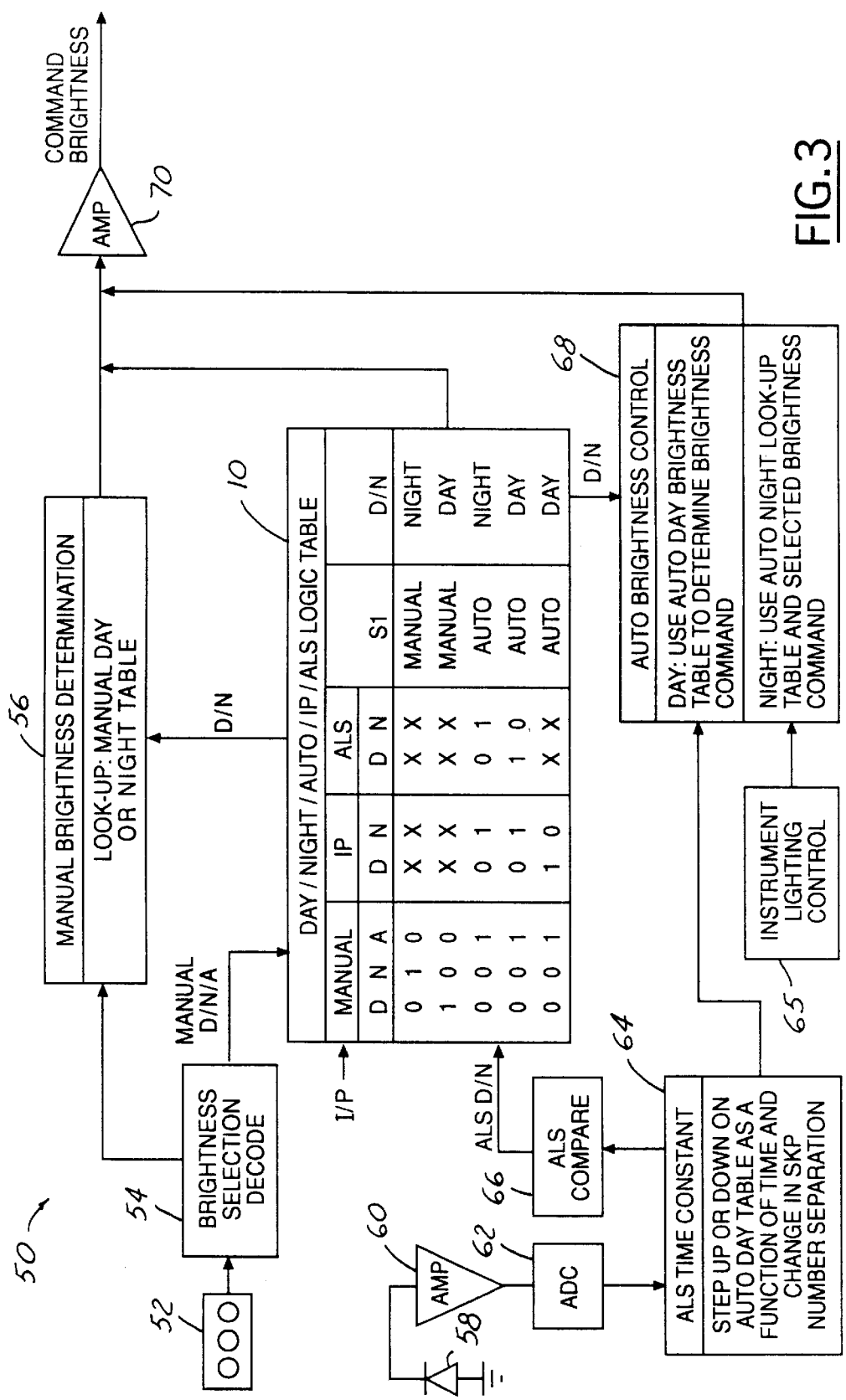
FIG. 3 is a block diagram of a preferred embodiment of the present invention.

FIG. 3 is a block diagram 50 of a preferred embodiment of the present invention. Input 52, as by a pushbutton or similar device, provides a manually selected input to a brightness selection decode block 54 that is typically implemented by software. The brightness selection, or step number, is determined based on the user's selection at the input 52. A manual brightness determination block 56, which is typically implemented by software, includes a look up table (i.e. FIG. 2) to determine the brightness, depending on the user selection of "Day" or "Night" mode and the user selected brightness level. The look up table provides the brightness level that is commanded to the display.

An ambient light sensor 58 senses the ambient light impinging on the display, typically on the bezel of the display. The signal from the light sensor is conditioned as by amplifier 60 and sent to an analog/digital converter 62. The converter 62 digitizes the ambient light sensor signal. The digitized signal is filtered by an ambient light sensor time constant block 64. The filtering eliminates objectionable display brightness changes as a result of intermittent display shadowing. A comparison 66 is used to aid in the determination of whether a nighttime automatic mode should be used when the headlights are active.

When daytime lighting conditions are sensed by the ambient light sensor, and the headlights are active, an auto brightness control scheme 68 for daytime lighting conditions is implemented overriding the nighttime brightness levels and maintaining a visible display. Similarly, when nighttime lighting conditions are sensed, the auto brightness control scheme for nighttime brightness levels is implemented.

The logic table 10 includes the logic used to determine day or night (D/N) and manual or auto modes.

Once the proper brightness level is determined, the corresponding brightness command is amplified by amplifier 70 and sent to the display or other brightness control circuitry (not shown) to control the display brightness.

Any one of many types of ambient light sensors may be used in the present invention. In the preferred embodiment of the present invention, the light sensor is a logarithmic ambient light sensor that is described in co-pending application Ser. No. 09/642,178 Light Sensor System and a Method for Detecting Ambient Light. The logarithmic function is desired, although not necessary, because it has the dynamic range to determine the day/night threshold, and provide for automatic brightness control as a function of the ambient illumination. Note that the values described in FIG. 2 are for a linear light sensor system. The use of a logarithmic light sensor changes the values for the ALS ADC counts 72 as shown in FIG. 4 where reference number 42 represents the step number and reference number 32 represents the ALSTC comparison. The advantage of the logarithmic sensor lies in the fact that equal ALS ADC counts result between constant brightness step ratios which is described in detail in co-pending patent application Ser. No. 09/747597.

The invention covers all alternatives, modifications, and equivalents, as may be included within the spirit and scope of the appended claims.

What is claimed is:

1. A method for maintaining visibility of a display in a vehicle's cockpit when the vehicle's headlights are turned on during daytime lighting conditions, said method comprising the steps of:

determining a status of a lighting switch indicating a vehicle's headlight status detecting an ambient light level;

determining lighting conditions based on said detected ambient light level;

logically selecting a brightness level to be commanded to said display based on said vehicle's headlight status, said detected ambient light level, and said determined lighting conditions;

overriding an automatic nighttime luminance control of said display; and applying said selected brightness level to said display increasing said brightness level of said display to an appropriate daytime brightness level for maintaining visibility of said display particularly during periods of daytime lighting conditions when said vehicle's headlights are active.

2. The method as claimed in claim 1 further comprising the step of applying a time constant filter and hysteresis to said ambient light sensor output for determining nighttime versus daytime.

3. The method as claimed in claim 1 wherein said step of logically determining a brightness level to be commanded further comprises determining whether a manually selected brightness level is desired or an automatically selected brightness level is desired.

4. The method as claimed in claim 3 further comprising the steps of:

selecting a predetermined brightness command from a source containing stored values for daytime and nighttime lighting conditions when a manual mode is selected; and selecting a predetermined brightness command from a source containing stored values for daytime and nighttime lighting conditions when an automatic mode is selected.

5. The method as claimed in claim 4 further comprising the step of applying a time constant filter to said step of selecting a predetermined brightness command in a daytime automatic mode for preventing objectionable switching of a brightness level of said display.

6. The method as claimed in claim 4 further comprising the step of applying a software filter algorithm to said step of selecting a predetermined brightness command in a daytime automatic mode to control a speed of transition between brightness levels of said display.

7. The method as claimed in claim 4 further comprising the steps of:

applying a time constant filter to said step of selecting a predetermined brightness command in an automatic mode for preventing objectionable switching of a brightness level of said display; and applying a software filter algorithm to said step of selecting a predetermined brightness command in a daytime automatic mode to control a speed of transition between brightness levels of said display.

8. The method as claimed in claim 1 further comprising the step of selecting a predetermined brightness command only from a source containing stored values for daytime lighting conditions when said headlights are inactive.

9. The method as claimed in claim 1 wherein said step of logically selecting a brightness level further comprises selecting a brightness level based on an instrument lighting control setting during an automatic nighttime mode.

10. A system for maintaining visibility of a display in a vehicle's cockpit when the vehicle's headlights are turned on during daytime lighting conditions and an automatic nighttime luminance control is activated, said system comprising:

an ambient light sensor having an output;

a switch having an output that indicates a status of the vehicle's headlights; and an algorithm using said ambient light sensor output and said headlight status to logically determine a brightness level to be commanded to the display by overriding the automatic nighttime luminance control and increasing a brightness level of the display to said logically determined brightness level.

11. The system as claimed in claim 10 further comprising a filter applied to said ambient light sensor output for determining a rate of transition between display brightness levels.

12. The system as claimed in claim 11 wherein said filter further comprises a time delay for controlling a transition from daytime lighting conditions to nighttime lighting conditions.

13. The system as claimed in claim 10 further comprising a night-to-day hysteresis for controlling a transition from nighttime lighting conditions to daytime lighting conditions.

14. The system as claimed in claim 13 wherein said night-to-day hysteresis further comprises:

a nighttime threshold brightness level;

a daytime threshold brightness level; and a predetermined value said ambient light sensor output must increase over said nighttime threshold level to transition from nighttime lighting conditions to daytime lighting conditions.

15. The system as claimed in claim 14 further comprising:

a predetermined value said ambient light sensor output must decrease below said nighttime threshold brightness for determining a transition from daytime to nighttime lighting conditions: and wherein said predetermined value for determining a transition from nighttime to daytime lighting conditions is greater than said predetermined value for determining a transition from daytime to nighttime lighting conditions.

16. The system as claimed in claim 10 wherein said ambient light sensor is a logarithmic sensor.

17. The system as claimed in claim 10 further comprising a switch for selecting between a manual and an automatic mode of operation for said system.

18. The system as claimed in claim 17 wherein said algorithm uses a manual brightness determination look up table to determine said brightness level to be commanded for said manual mode of operation.

19. The system as claimed in claim 17 wherein said algorithm uses an automatic brightness control scheme to determine a brightness level to be commanded to said display for an automatic mode.

20. The system as claimed in claim 10 wherein said algorithm logically determines a daytime brightness level to be commanded to said display when said switch indicates active headlights and said ambient light sensor indicates daytime lighting conditions in order to avoid an objectionable brightness level for said display.

21. The system as claimed in claim 10 wherein said algorithm logically determines a nighttime brightness level to be commanded to said display based on an instrument lighting control setting.

* * * * *